US012637582B2

(12) United States Patent
Akizuki et al.

(10) Patent No.: US 12,637,582 B2
(45) Date of Patent: May 26, 2026

(54) COMPOSITION FOR COATING MATERIALS

(71) Applicants: NIPPON PAINT AUTOMOTIVE COATINGS CO., LTD., Osaka (JP); OTSUKA CHEMICAL CO., LTD., Osaka (JP)

(72) Inventors: Shinsuke Akizuki, Hirakata (JP); Yasunori Miwa, Hirakata (JP); Sachiko Morimoto, Hirakata (JP); Yuki Inoue, Hirakata (JP); Satoru Masumoto, Tokushima (JP)

(73) Assignees: NIPPON PAINT AUTOMOTIVE COATINGS CO., LTD., Osaka (JP); OTSUKA CHEMICAL CO., LTD., Osaka (JP)

(*) Notice: Subject to any disclaimer, the term of this patent is extended or adjusted under 35 U.S.C. 154(b) by 543 days.

(21) Appl. No.: 18/024,813

(22) PCT Filed: Sep. 2, 2021

(86) PCT No.: PCT/JP2021/033069
§ 371 (c)(1),
(2) Date: Mar. 6, 2023

(87) PCT Pub. No.: WO2022/054851
PCT Pub. Date: Mar. 17, 2022

(65) Prior Publication Data

US 2023/0312974 A1 Oct. 5, 2023

(30) Foreign Application Priority Data

Sep. 9, 2020 (JP) ................................ 2020-151233

(51) Int. Cl.
*C09D 153/00* (2006.01)
*C09D 7/63* (2018.01)

(52) U.S. Cl.
CPC ............ *C09D 153/00* (2013.01); *C09D 7/63* (2018.01)

(58) Field of Classification Search
CPC ................. C08F 220/06; C08F 220/20; C08F 220/1804; C08F 230/08; C08F 212/08;
(Continued)

(56) References Cited

U.S. PATENT DOCUMENTS

| | | | |
|---|---|---|---|
| 2005/0245714 A1 | 11/2005 | Yamago et al. |
| 2011/0071251 A1 | 3/2011 | Dana et al. |
| 2011/0178225 A1 | 7/2011 | Kudo et al. |

FOREIGN PATENT DOCUMENTS

| | | |
|---|---|---|
| CN | 101875707 | 11/2010 |
| CN | 109852272 A * | 6/2019 |

(Continued)

OTHER PUBLICATIONS

CN 109852272 A, 2019, machine translation (Year: 2019).*

(Continued)

*Primary Examiner* — Satya B Sastri
(74) *Attorney, Agent, or Firm* — Wenderoth, Lind & Ponack, L.L.P.

(57) ABSTRACT

The present invention provides a water-repellent coating composition which enables easy removal of dirt while having good appearance due to high compatibility of a water-repellent component with other materials. The present invention provides a coating composition, comprising a siloxane group-containing polymer (A) and a crosslinking agent (B), wherein the siloxane group-containing polymer (A) is a block copolymer comprising an A block and a B block, and containing, in the A block, at least a structural unit derived from a siloxane group-containing vinyl monomer (a) and containing, in the B block, a structural unit derived from a hydroxyl group-containing vinyl monomer (b) and, as (Continued)

| | EXAMPLE 1 | EXAMPLE 3 | EXAMPLE 4 | EXAMPLE 5 | EXAMPLE 9 |
|---|---|---|---|---|---|
| MICROPHASE-SEPARATED STRUCTURE | SPHERICAL (LOW DENSITY) | SPHERICAL - LINEAR | SPHERICAL - LINEAR | SPHERICAL (HIGH DENSITY) | LAMELLAR |
| TEM PHOTOGRAPH |  |  |  |  |  | necessary, a structural unit derived from another vinyl monomer (c) copolymerizable with the vinyl monomers (a) and (b), and is a copolymer having a molecular weight distribution (Mw/Mn) of 2.0 or less and polymerized by living radical polymerization.

12 Claims, 1 Drawing Sheet

(58) Field of Classification Search
CPC ............. C08F 293/005; C08F 2438/00; C09D 153/00; C09D 187/005; C08G 77/442; C08G 81/024; C08G 18/61; C08G 18/6469
See application file for complete search history.

(56) References Cited

FOREIGN PATENT DOCUMENTS

| | | |
|---|---|---|
| EP | 4 083 098 | 11/2022 |
| JP | 11-293184 | 10/1999 |
| JP | 2019-199600 | 11/2019 |
| WO | 2021/131726 | 7/2021 |

OTHER PUBLICATIONS

English language translation of International Preliminary Report on Patentability issued Mar. 23, 2023 in International (PCT) Patent Application No. PCT/JP2021/033069.
International Search Report (ISR) issued Nov. 30, 2021 in International (PCT) Application No. PCT/JP2021/033069.
Xumin Zheng et al. "Synthesis of Si-containing macro-RAFT agent for the water-borne polyacrylate polyurethane with anti-graffiti coating applications", Materials Today Communications, vol. 25, pp. 1015901/1-105901/9, Aug. 31, 2020, cited in both ISR & CD.
Bo Li et al., "Synthesis of POSS-containing fluorosilicone block copolymers via RAFT polymerization for application as non-wetting coating materials", Progress in Organic Coatings, vol. 78, pp. 188-199, 2015, cited in ISR.
Japanese Office Action issued Mar. 22, 2022 in corresponding Japanese Patent No. 7061241B (Japanese Patent Application No. 2022-505638) together with machine English translation thereof.
Extended European Search Report issued Sep. 4, 2024 in European Application No. 21866809.3.

* cited by examiner

| | EXAMPLE 1 | EXAMPLE 3 | EXAMPLE 4 | EXAMPLE 5 | EXAMPLE 9 |
|---|---|---|---|---|---|
| MICROPHASE-SEPARATED STRUCTURE | SPHERICAL (LOW DENSITY) | SPHERICAL - LINEAR | SPHERICAL - LINEAR | SPHERICAL (HIGH DENSITY) | LAMELLAR |
| TEM PHOTOGRAPH | 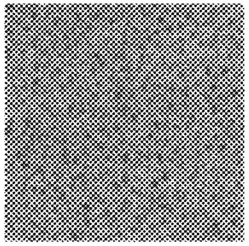 | 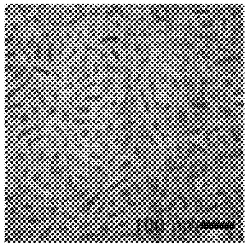 | 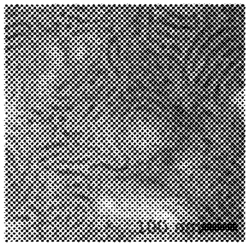 | 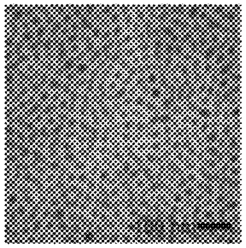 | 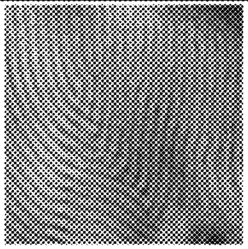 |

COMPOSITION FOR COATING MATERIALS

TECHNICAL FIELD

The present invention relates to a coating composition, particularly a coating composition for providing a coating film with water repellency.

BACKGROUND ART

A surface of a car or the like is desired to be kept clean through washing away of dirt with rainwater without vehicle washing, namely, to be so-called "vehicle wash-free". There are two types of vehicle wash-free techniques: a method in which a surface is made hydrophilic and dirt is washed away with rainwater; and a method in which a surface is made water-repellent and water droplets are blown off together with dirt during traveling. A water-repellent appearance that repels water well tends to be preferred by people in an appearance of a luxury car or the like.

In order to make a surface of a coating film water-repellent, a fluorine-based material or a silicone-based material is often used as a water-repellent material. Fluorine-based materials are effective because of their high water repellency. At the present time, however, fluorine-based materials are expensive and are difficult to use for conventional paint, and there are also problems such as environmental pollution; therefore, fluorine-based materials are not easy to use. Silicone-based materials have advantages of being easily used for general purposes, and therefore have been developed earlier. For example, JP-A-11-293184 (Patent Literature 1) proposes a polymer composition containing a siloxane macromonomer having unsaturated bonds at both ends. However, since a silicone-based material is inferior to a fluorine-based material in water-repelling ability, the silicone-based material is used inevitably in an increased amount, causing problems in compatibility with other materials to be blended and adhesion to a base coating film. In addition, silicone-based materials have problems in tensile strength or tear strength and are said to be necessary to be improved also in wear resistance.

CITATIONS LIST

Patent Literature

Patent Literature 1: JP-A-11-293184

SUMMARY OF INVENTION

Technical Problems

An object of the present invention is to provide a water-repellent coating composition which enables easy removal of dirt while having good appearance due to high compatibility of a water-repellent component with other materials.

Solutions to Problems

That is, the present invention provides: [1] a coating composition which comprises a siloxane group-containing polymer (A) and a crosslinking agent (B), wherein the siloxane group-containing polymer (A) is a block copolymer comprising an A block and a B block, and containing, in the A block, at least a structural unit derived from a siloxane group-containing vinyl monomer (a) and containing, in the B block, a structural unit derived from a hydroxyl group-containing vinyl monomer (b) and, as necessary, a structural unit derived from another vinyl monomer (c) copolymerizable with the vinyl monomers (a) and (b), and the siloxane group-containing polymer (A) is a copolymer having a molecular weight distribution (Mw/Mn) of 2.0 or less and polymerized by living radical polymerization. In addition, the present invention further provides the following embodiments.

[2] The coating composition according to [1], wherein the siloxane group-containing polymer (A) is an AB-type diblock copolymer or an ABA-type triblock copolymer.

[3] The coating composition according to [1] or [2], wherein the siloxane group-containing polymer (A) has a weight average molecular weight (Mw) of 5,000 to 100,000.

[4] The coating composition according to any one of [1] to [3], wherein the living radical polymerization is a method in which the polymerization is performed using an organic tellurium compound represented by formula (I):

[Chemical Formula 1]

(1)

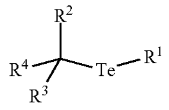

wherein $R^1$ represents a $C_1$ to $C_8$ alkyl group, aryl group, substituted aryl group, or aromatic heterocyclic group, $R^2$ and $R^3$ each represent a hydrogen atom or a $C_1$ to $C_8$ alkyl group, $R^4$ represents an aryl group, a substituted aryl group, an aromatic heterocyclic group, an acyl group, an oxycarbonyl group, or a cyano group.

[5] The coating composition according to any one of [1] to [4], further comprising a hydroxyl group-containing polymer (C).

[6] The coating composition according to any one of [1] to [5], wherein the blending ratio of the siloxane group-containing polymer (A) and the hydroxyl group-containing polymer (C) is 15:85 to 80:20 in terms of a weight ratio of the siloxane group-containing polymer (A):the hydroxyl group-containing polymer (C).

[7] The coating composition according to any one of [1] to [6], wherein the siloxane group-containing vinyl monomer (a) has a number average molecular weight (Mn) of 500 to 50,000.

[8] The coating composition according to any one of [1] to [7], wherein the crosslinking agent (B) is an isocyanate-based crosslinking agent.

Advantageous Effects of Invention

In the present invention, water repellency can be imparted to a coating film by blending a siloxane group-containing polymer. Since the siloxane group-containing polymer is firmly incorporated in a coating film through a crosslinking reaction of the coating film, the siloxane group-containing polymer does not separate or bleed, and can stably retain water-repelling performance for a long period of time. In addition, when the siloxane group-containing polymer is a block copolymer, a moiety contributing to the crosslinking reaction of the coating film and a siloxane moiety imparting water repellency are separated in the polymer molecule, so that the function of each moiety is exerted without interference from the other moiety, and the function of fixing to a crosslinked moiety and the function of a polysiloxane moiety for water repellency can be exerted clearly and for a long time. Owing to this, water repellency can be exerted even at a small blending amount of the siloxane group-containing polymer.

When a coating film formed from the coating composition of the present invention is present on a surface of a car or the like, water repellency can be stably retained for a long period of time, so that rainwater or the like is scattered in the form of water droplets (ball-like water droplets) during traveling. Therefore, dirt such as dust present on the coating film is eliminated from the coating film by rainwater containing the dirt during traveling when it rains. Since the siloxane moiety also has oil repellency, adhesion of an oily substance is reduced, and oily dirt is also reduced.

In addition, when the siloxane group-containing polymer (A) of the present invention is used, since the siloxane group moiety is firmly present in the coating film without being separated and bleeding, not only its performance can be stably exerted for a long period of time, but also other performance of the coating film, for example, tensile strength, tear strength, or wear resistance, is retained without being adversely affected, so that these performances are also kept high.

BRIEF DESCRIPTION OF DRAWINGS

FIG. 1 shows photographs of coating films formed in Examples 1, 3, 4, 5 and 9 observed with a transmission electron microscope (TEM).

DESCRIPTION OF EMBODIMENTS

The coating composition of the present invention comprises a siloxane group-containing polymer (A) and a cross-linking agent (B), and may comprise an additional hydroxyl group-containing polymer (C), as necessary. Each of the components will be described.

<Siloxane Group-Containing Polymer (A)>

The siloxane group-containing polymer (A) is a block copolymer comprising an A block and a B block, and containing, in the A block, at least a structural unit derived from a siloxane group-containing vinyl monomer (a) and containing, in the B block, structural units derived from a hydroxyl group-containing vinyl monomer (b) and, as necessary, another vinyl monomer (c) copolymerizable with the vinyl monomers (a) and (b), and is a copolymer having a molecular weight distribution (Mw/Mn) of 2.0 or less and polymerized by living radical polymerization.

In the present description, the "vinyl monomer" refers to a monomer having a radically polymerizable carbon-carbon double bond in the molecule. The "structural unit derived from a vinyl monomer" refers to a structural unit in which a radically polymerizable carbon-carbon double bond of a vinyl monomer has been converted into a carbon-carbon single bond through polymerization.

The siloxane group-containing vinyl monomer (a) is not particularly limited as long as it is a vinyl monomer having a siloxane group (more specifically, a polysiloxane group). The siloxane group-containing vinyl monomer is more specifically represented by the following formula I:

[Chemical Formula 2]

Formula I

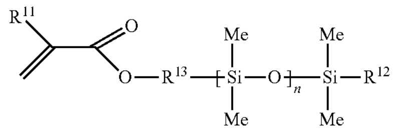

wherein Me represents a methyl group, $R^{11}$ represents a hydrogen atom or a methyl group, $R^{12}$ represents a hydrogen atom or an alkyl group having 1 to 4 carbon atoms, $R^{13}$ represents an alkyl group having 1 to 6 carbon atoms in which an oxygen atom may be interposed, and n represents 0 or an integer of 1 or more. As the siloxane group-containing vinyl monomer (a) of the formula (I), a reaction product of an alcohol group present at an end of a polysiloxane represented by the following formula II:

[Chemical Formula 3]

Formula II

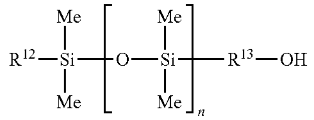

with (meth)acrylic acid is suitable. In the formula I, $R^{11}$ is a group derived from (meth)acrylic acid, and represents a hydrogen atom or a methyl group. In the formulas I and II, $R^{12}$ is a hydrogen atom or an alkyl group having 1 to 4 carbon atoms, and Me is a methyl group. $R^{13}$ is an alkyl group having 1 to 6 carbon atoms. n is 0 or an integer of 1 or more, and n is preferably 6 to 300. In the present description, "(meth)acrylic" or "(meth)acrylate" means either or both of acrylic and methacrylic, or either or both of acrylate and methacrylate.

More specifically, the siloxane group-containing vinyl monomer (a) having the formula (I) is commercially available from Shin-Etsu Chemical Co., Ltd. (modified silicone oil series) and JNC Corporation (Silaplane (registered trademark)), and examples thereof include X-22-2404 [functional group equivalent (g/mol): 420] [number average molecular weight: 420], X-22-174ASX [functional group equivalent (g/mol): 900] [number average molecular weight: 900], X-22-174BX [functional group equivalent (g/mol): 2,300] [number average molecular weight: 2300], KF-2012 [functional group equivalent (g/mol): 4,600] X-22-2426 [functional group equivalent (g/mol): 12,000] [number average molecular weight: 12000] manufactured by Shin-Etsu Chemical Co., Ltd., and FM-0711 [number average molecular weight: 1000], FM-0721 [number average molecular weight: 5000], FM-0725 [number average molecular weight: 10000] manufactured by JNC Corporation (the above listed are all commercial names). When the siloxane group-containing vinyl monomer is monofunctional, the functional group equivalent [g/mol] can be regarded as the number average molecular weight of the siloxane group-containing vinyl monomer (a) with respect to 1 mol of siloxane.

The functional group equivalent of the siloxane group-containing vinyl monomer (a) is preferably 500 to 50,000, more preferably 600 to 3,000, and particularly preferably 700 to 1,200 from the viewpoint of polymerizability. In particular, superior compatibility is exhibited at 700 to 1,200. The functional group is a vinyl group, and the siloxane group-containing vinyl monomer (a) is preferably monofunctional from the viewpoint of polymerizability.

The number average molecular weight (Mn) of the siloxane group-containing vinyl monomer (a) is preferably 500 to 50,000, more preferably 600 to 3,000, and particularly preferably 700 to 1,200 from the viewpoint of releasability. In particular, superior compatibility is exhibited at 700 to 1,200.

The hydroxyl group-containing vinyl monomer (b) is a vinyl monomer having a hydroxyl group in the molecule, and more specifically, a reaction product of an alkyl polyol and (meth)acrylic acid is suitable. Examples of the hydroxyl group-containing vinyl monomer (b) include hydroxyl group-containing (meth)acrylates such as 2-hydroxyethyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, 8-hydroxyoctyl (meth)acrylate, 10-hydroxydecyl (meth)acrylate, (4-hydroxymethylcyclohexyl)methyl (meth)acrylate, glycerin monoacrylate, glycerin monomethacrylate, glycerin diacrylate, and glycerin dimethacrylate; and polyethylene glycol mono(meth) acrylates such as diethylene glycol monoacrylate, triethylene glycol monoacrylate, triethylene glycol monoacrylate, tetraethelene glycol monoacrylate, hexaethylene glycol monoacrylate, octaethylene glycol monoacrylate, diethylene glycol monomethacrylate, triethylene glycol monomethacrylate, triethylene glycol monomethacrylate, tetraethylene glycol monomethacrylate, hexaethylene glycol monomethacrylate, and octaethylene glycol monomethacrylate.

The additional copolymerizable vinyl monomer (c) may be any vinyl monomer copolymerizable with the vinyl monomers (a) and (b), and examples thereof include alkyl (meth)acrylates having a linear or branched chain such as methyl acrylate, ethyl acrylate, propyl acrylate, butyl acrylate, pentyl acrylate, hexyl acrylate, octyl acrylate, methyl methacrylate, ethyl methacrylate, propyl methacrylate, butyl methacrylate, pentyl methacrylate, hexyl methacrylate, and octyl methacrylate;

- carboxyl group-containing monomers such as (meth) acrylic acid and dimer acids of acrylic acid such as β-carboxyethyl acrylate;
- alicyclic ring-containing monomers such as cyclohexyl (meth)acrylate, cyclohexyloxyalkyl (meth)acrylate, t-butylcyclohexyloxyethyl (meth)acrylate, isobornyl (meth)acrylate, dicyclopentanyl (meth)acrylate, and dicyclopentanyl (meth)acrylate;
- phosphoric acid group-containing (meth)acrylates such as phosphoric acid ester of polyethylene glycol mono (meth)acrylate, phosphoric acid esters of polypropylene glycol mono(meth)acrylate such as (mono(propylene glycol monomethacrylate)phosphate, and alkylene (meth)acrylate phosphates such as methylene (meth) acrylate phosphate, trimethylene (meth)acrylate phosphate, propylene (meth)acrylate phosphate, and tetramethylene (meth)acrylate phosphate;
- sulfonic acid group-containing monomers or salts thereof such as olefinsulfonic acids such as ethylenesulfonic acid, allylsulfonic acid, and methallylsulfonic acid, 2-acrylamido-2-methylpropanesulfonic acid, styrenesulfonic acid;
- (meth)acrylamide-based monomers such as alkoxyalkyl (meth)acrylamide-based monomers such as methoxymethyl(meth)acrylamide, ethoxymethyl(meth) acrylamide, propoxymethyl(meth)acrylamide, isopropoxymethyl(meth)acrylamide, n-butoxymethyl (meth)acrylamide, and isobutoxymethyl(meth) acrylamide, (meth)acryloylmorpholine, dimethyl (meth)acrylamide, diethyl (meth)acrylamide, (meth) acrylamide, and N-methylol(meth)acrylamide; and
- glycidyl acrylate, furfuryl acrylate, tetrahydrofurfuryl acrylate, glycidyl methacrylate, furfuryl methacrylate, tetrahydrofurfuryl methacrylate, methyl vinyl ketone, styrene, α-methylstyrene, N-vinylcaprolactam, and vinyl acetate. In particular, isobornyl (meth)acrylate and dicyclopentanyl (meth)acrylate are preferable from the viewpoint of balance of physical properties of a coating film.

In the siloxane group-containing polymer (A), the content of a structural unit derived from the polysiloxane group-containing vinyl monomer (a) is preferably 5 to 35% by weight, the content of a structural unit derived from the hydroxyl group-containing vinyl monomer (b) is preferably 5 to 35% by weight, and the content of a structural unit derived from the additional vinyl monomer (c) copolymerizable with the vinyl monomers (a) and (b) is preferably 30 to 90% by weight. When the amount of the siloxane group-containing vinyl monomer (a) is large to some extent, water repellency is imparted to a coating film, but when the amount of the structural unit derived from the siloxane group-containing vinyl monomer (a) is excessively large, a coating film is adversely affected, which is undesirable. The amount of the structural unit derived from the hydroxyl group-containing vinyl monomer (b) is preferably as larger as possible because copolymerization occurs at a large number of reaction sites. The amount of the structural unit derived from the hydroxyl group-containing vinyl monomer (b) can be controlled by the hydroxyl value of the siloxane group-containing polymer (A), and the hydroxyl value of the siloxane group-containing polymer (A) is preferably 30 to 250 mg KOH/g, and particularly preferably 70 to 170 mg KOH/g. When the hydroxyl value is less than 30 mg KOH/g, there is a possibility that the siloxane group-containing polymer (A) is not sufficiently reacted with isocyanate and a coating film having a low crosslinking density is formed, whereas when the hydroxyl value is more than 250 mg KOH/g, there is a possibility that the water resisting performance of a coating film is deteriorated.

The siloxane group-containing polymer (A) is a block copolymer comprising an A block and a B block, wherein a structural unit derived from a polysiloxane group-containing vinyl monomer (a) is contained in the A block and a structural unit derived from a hydroxyl group-containing vinyl monomer (b) is contained in the B block. The B block preferably further contains a structural unit derived from an additional vinyl monomer (c) copolymerizable with the vinyl monomers (a) and (b). The block copolymer is preferably an AB-type diblock copolymer or an ABA-type triblock copolymer. More specifically, the A block in the block copolymer contains a structural unit derived from the polysiloxane group-containing vinyl monomer (a), and can impart water/oil repellency to a coating film. In addition, the B block of the block copolymer contains a structural unit derived from the hydroxyl group-containing vinyl monomer (b), and can be crosslinked with the crosslinking agent (B) to form a three-dimensional network structure, so that durability can be improved. That is, since the hydroxyl group-containing vinyl monomer (b) having reactivity with the crosslinking agent is not introduced into the A block but concentrated in the B block, the functions of the respective polymer blocks, namely, the A block and the B block can be clearly divided.

When the A block and the B block have different polarities or are incompatible with each other, or when there is a polymer compatible with the A block or the B block, a microphase-separated structure may be formed in the coating film. In particular, when a coating film has a microphase-separated structure, the functions of the respective polymer blocks, namely, the A block and the B block are most clearly divided, so that superior functions are exhibited. It is confirmed by a transmission micrograph (TEM photograph) or the like obtained by thinly slicing a coating film that the microphase-separated structure microscopically has an islands-in-the-sea (spherical) structure, a columnar (linear) structure, or a lamellar structure.

When the copolymer is not a block polymer but a randomly copolymerized polymer, a structural unit derived from a polysiloxane group-containing vinyl monomer (a) and a structural unit derived from a hydroxyl group-containing vinyl monomer (b) having reactivity with a crosslinking agent are mixed, and thus the copolymer may be difficult to exhibit functions or may be poor in compatibility depending on the composition.

In an adoptable method for producing the AB-type diblock copolymer as the siloxane group-containing polymer (A) of the present invention, an A block is produced first, and then a monomer for a B block is polymerized with the A block; a B block is produced first, and then a monomer for an A block is polymerized with the B block; or an A block and a B block are produced separately, and then the A block is coupled with the B block.

For example, the AB-type diblock copolymer is obtained by sequentially polymerizing vinyl monomers that will constitute blocks by a radical polymerization method. Specifically, an adoptable production method comprises a step of polymerizing a vinyl monomer for constituting one of an A block and a B block to generate the one block, and a step of, after generating the one block, polymerizing a vinyl monomer for constituting the other block of the A block and the B block to generate the other block.

It is difficult to obtain the effect of the present invention when an acrylic polymer obtained by conventional radical polymerization (free radical polymerization: FRP) is used. In free radical polymerization, radical species are continuously generated during the reaction and added to vinyl monomers, and the polymerization proceeds. Therefore, in free radical polymerization, a polymer in which a growing terminal radical has been deactivated in the middle of the reaction or a polymer grown by a radical species newly generated during the reaction is generated. Therefore, when an acrylic polymer containing a crosslinkable functional group is produced by free radical polymerization, a polymer containing no structural unit derived from a crosslinkable functional group-containing vinyl monomer having a relatively low molecular weight is produced.

A crosslinkable acrylic polymer resulting from polymerization by free radical polymerization is uneven in the composition of the polymer and contains no crosslinkable functional group-containing vinyl monomer having a relatively low molecular weight, so that the polymer includes a polymer chain that cannot participate in crosslinking. Furthermore, the composition is uneven, and for example, a homopolymer in which only a siloxane-containing vinyl monomer is polymerized or the like is generated, which will cause deterioration of the compatibility of resins and may cause coating film defects such as cloudiness and cissing.

Therefore, the copolymer is a copolymer resulting from polymerization by living radical polymerization. By living radical polymerization, a polymer having more uniform molecular weight and composition as compared with the free radical polymerization or the like can be obtained, and generation of low molecular weight components or the like can be controlled, so that bleeding out or the like with time is less likely to occur. The living radical polymerization method can be categorized, in terms of difference in technique to stabilize polymerization growth terminals, for example into a method using a transition metal catalyst (ATRP method), a method using a sulfur-based reversible chain transfer agent (RAFT method), and a method using an organic tellurium compound (TERP method). Since the ATRP method uses an amine-based complex, there is a case where the ATRP method cannot be used unless an acidic group of a vinyl monomer having an acidic group is protected. In the RAFT method, when various monomers are used, it is difficult to attain a low molecular weight distribution, and there may occur defects such as sulfur odor and coloring. Among these methods, the TERP method is preferably used from the viewpoint of diversity of monomers that can be used, molecular weight control in a polymer region, uniform composition, or coloring. The TERP method is a method of polymerizing a radically polymerizable compound (vinyl monomer) using an organic tellurium compound as a chain transfer agent, and examples thereof include the methods described in WO 2004/14848 A, WO 2004/14962 A, WO 2004/072126 A, and WO 2004/096870 A.

As the TERP method, a method of conducting polymerization using an organic tellurium compound represented by the following formula (1) is preferable, and a method of conducting polymerization using a mixture of an organic tellurium compound represented by the following formula (1) and an organic ditelluride compound represented by the following formula (2) is more preferable.

Formula (1):

[Chemical Formula 4]

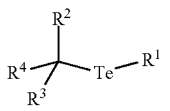

(1)

wherein, $R^1$ represents a $C_1$ to $C_8$ alkyl group, aryl group, substituted aryl group, or aromatic heterocyclic group; $R^2$ and $R^3$ each represent a hydrogen atom or a $C_1$ to $C_8$ alkyl group; $R^4$ represents an aryl group, a substituted aryl group, an aromatic heterocyclic group, an acyl group, an oxycarbonyl group, or a cyano group.

Formula (2):

$$(R^1Te)_2 \quad (2)$$

wherein $R^1$ is the same as described above.

Examples of the organic tellurium compound represented by the formula (1) include the organic tellurium compounds described in WO 2004/14848 A, WO 2004/14962 A, WO 2004/072126 A, and WO 2004/096870 A, such as ethyl-2-methyl-2-n-butyltellanyl-propionate, ethyl-2-n-butyltellanyl-propionate, and (2-hydroxyethyl)-2-methyl-methyltellanyl-propionate. Examples of the organic ditelluride compound represented by the formula (2) include dimethylditelluride and dibutylditelluride.

In the polymerization step, a vinyl monomer, an organic tellurium compound represented by the general formula (1), and, for the purpose of accelerating the reaction, controlling the molecular weight and molecular weight distribution, and the like depending on the type of the vinyl monomer, an organic ditelluride compound represented by the formula (2) are mixed in a vessel purged with an inert gas. At this time, examples of the inert gas include nitrogen, argon, and helium. Argon and nitrogen are preferable. The amount of the vinyl monomer to be used may be appropriately adjusted according to the physical properties of an intended copolymer.

The polymerization is usually carried out without a solvent, but an organic solvent commonly used in radical polymerization may be used. Examples of the solvent that can be used include benzene, toluene, N,N-dimethylformamide (DMF), dimethyl sulfoxide (DMSO), acetone, chloroform, carbon tetrachloride, tetrahydrofuran (THF), ethyl acetate, and trifluoromethylbenzene. In addition, an aqueous solvent can also be used, and examples thereof include water, methanol, ethanol, isopropanol, n-butanol, ethyl cellosolve, butyl cellosolve, and 1-methoxy-2-propanol. The amount of the solvent to be used may be appropriately adjusted, and for example, the amount of the solvent is preferably 0.01 to 100 ml for 1 g of the vinyl monomer. The reaction temperature and the reaction time may be appropriately adjusted according to the molecular weight or molecular weight distribution of a copolymer to be obtained, and stirring is usually conducted at 0° C. to 150° C. for 1 minute to 100 hours. After completion of the polymerization reaction, the reaction mixture obtained is subjected to removal of the solvent used and the residual vinyl monomer, and the like with an ordinary separation and purification means, so that an intended copolymer can be separated.

Living radical polymerization is polymerization in which a molecular chain grows without the polymerization reaction being hindered by a side reaction such as a termination reaction or a chain transfer reaction. In living radical polymerization, all polymer chains are polymerized while uniformly reacting with a monomer during the reaction, and the composition of all polymers approaches uniform. When such a crosslinkable acrylic polymer is crosslinked using a crosslinking agent, almost all polymers can participate in crosslinking between polymer chains.

The siloxane group-containing polymer (A) is obtained through copolymerization of a polysiloxane group-containing vinyl monomer (a), a hydroxyl group-containing vinyl monomer (b), and an additional unsaturated monomer (c) copolymerizable therewith as described above, and preferably has a number average molecular weight (Mn) of 3,000 to 100,000, and further preferably has a molecular weight distribution (Mw/Mn) of the siloxane group-containing polymer (A) of 2.0 or less.

When the number average molecular weight (Mn) of the siloxane group-containing polymer (A) is as relatively high as 3,000 to 100,000, bleeding out hardly occurs and initial surface characteristics can be maintained for a long period of time. The weight average molecular weight (Mw) of the siloxane group-containing polymer (A) is preferably 5,000 to 100,000. The lower limit value of Mw is more preferably 8,000. The upper limit value of Mw is more preferably 80,000, still more preferably 30,000, and most preferably 20,000. When the number average molecular weight and the weight average molecular weight are lower than the lower limit values, bleeding is likely to occur, and conversely, when the number average molecular weight and the weight average molecular weight are higher than the upper limit values, handling is difficult due to an increase in viscosity, and cloudiness may occur.

When the molecular weight distribution (Mw/Mn) of the siloxane group-containing polymer is 2.0 or less, the molecular weight distribution is sharp and a transparent coating film is uniformly obtained with good compatibility with a coating film. The Mw/Mn of the block copolymer is preferably 1.8 or less, more preferably 1.5 or less, and still more preferably 1.3 or less. In the present invention, the molecular weight distribution is determined by (weight average molecular weight (Mw) of block copolymer)/(number average molecular weight (Mn) of block copolymer), and the smaller the Mw/Mn is, the narrower the width of the molecular weight distribution of the copolymer becomes, the more uniform the molecular weight of the copolymer becomes, and when the value of the molecular weight distribution is 1.0, the width of the molecular weight distribution is narrowest. On the other hand, as the Mw/Mn is larger, a polymer having a smaller molecular weight or a polymer having a larger molecular weight than the molecular weight of a designed polymer is included more and compatibility may be deteriorated. A siloxane group-containing polymer having an excessively small molecular weight dissolves but causes troubles with a coating film such as bleeding out, whereas a siloxane group-containing polymer having an excessively large molecular weight is poor in solubility in other polymer resins and causes a trouble such as clouding of a coating film.

<Crosslinking Agent (B)>

The crosslinking agent to be blended in the coating composition of the present invention is not particularly limited, but is one that undergoes a crosslinking reaction with a hydroxyl group present in the siloxane group-containing polymer (A), and examples thereof include isocyanate-based crosslinking agents, epoxy-based crosslinking agents, aminoplast resins, and glyoxal. These crosslinking agents may be used singly, or two or more of them may be used in combination.

The isocyanate-based crosslinking agent refers to a compound having two or more isocyanate groups in one molecule. Examples of the isocyanate-based crosslinking agent include aliphatic polyisocyanates, alicyclic polyisocyanates, araliphatic polyisocyanates, aromatic polyisocyanates, and derivatives of these polyisocyanates. As the isocyanate-based crosslinking agent, only one agent may be used alone, or two or more agents may be used in combination.

Examples of the aliphatic polyisocyanate to be used as the crosslinking agent (B) include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethylcaproate; and aliphatic triisocyanates such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptan, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the araliphatic polyisocyanate include araliphatic diisocyanates such as 1,3- or 1,4-xylylene diisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof; and araliphatic triisocyanates such as 1,3,5-triisocyanatomethylbenzene.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, and 4,4'-diphenyl ether diisocyanate; aromatic triisocyanates such as triphenylmethane-4,4',4''-triisocyanate, 1,3,5-triisocyanatobenzene, and 2,4,6-triisocyanatotoluene; and aromatic tetraisocyanates such as 4,4'-diphenylmethane-2,2',5,5'-tetraisocyanate.

The aromatic polyisocyanate may be yellowed by ultraviolet rays and is unfavorable from the viewpoint of weather resistance. Aliphatic polyisocyanates are preferable from the viewpoint of weather resistance and the like, and alicyclic polyisocyanates may be used in combination, as necessary.

Examples of the derivative of polyisocyanate include dimer, trimer, biuret, allophanate, carbodiimide, uretdione, uretimine, isocyanurate, oxadiazinetrione, polymethylene polyphenyl polyisocyanate (crude MDI, polymeric MDI), and crude TDI of the polyisocyanate curing agent described above. In particular, biuret, allophanate, and isocyanurate are preferable, and isocyanurate is most preferable from the viewpoint of balance of physical properties of a coating film.

The isocyanate-based crosslinking agent is usually used with an isocyanate group blocked with a blocking agent. The blocking agent is stable at ordinary temperature but can regenerate a free isocyanate group when heated to or above the dissociation temperature thereof. Examples of the blocking agent include a compound having an active hydrogen group (e.g., alcohols and oximes). Examples of the blocking agent that may preferably be used include monohydric alkyl (or aromatic) alcohols such as n-butanol, n-hexyl alcohol, 2-ethylhexanol, lauryl alcohol, phenol carbinol and methylphenyl carbinol; cellosolves such as ethylene glycol monohexyl ether and ethylene glycol mono-2-ethylhexyl ether; polyether-type both-ended diols such as polyethylene glycol, polypropylene glycol and polytetramethylene ether glycol phenol; polyester-type both-ended polyols obtained from a diol such as ethylene glycol, propylene glycol or 1,4-butanediol and a dicarboxylic acid such as oxalic acid, succinic acid, adipic acid, suberic acid or sebacic acid; phenols such as para-t-butylphenol and cresol; oximes such as dimethyl ketoxime, methyl ethyl ketoxime, methyl isobutyl ketoxime, methyl amyl ketoxime and cyclohexanone oxime; and lactams typified by s-caprolactam and γ-butyrolactam. Among them, a blocked isocyanate compound obtained by blocking hexamethylene diisocyanate or a nurate form thereof with a blocking agent is more suitably used.

In the coating composition of the present invention, from the viewpoint of the curability of a coating film, the stability of the composition, and the like, the mixing ratio of the siloxane group-containing polymer (A) and the polyisocyanate curing agent is such that the ratio of the isocyanate group equivalent of the isocyanate-based crosslinking agent/the hydroxyl group equivalent of the siloxane group-containing polymer (A) is preferably 0.5 to 2.5, more preferably 0.9 to 1.5. When the ratio of the isocyanate group equivalent of the polyisocyanate curing agent/the hydroxyl group equivalent of the siloxane group-containing polymer (A) is less than 0.5, the crosslinkability is insufficient, and when the ratio is more than 2.5, yellowing by heat tends to occur.

The epoxy-based crosslinking agent to be used as the crosslinking agent (B) refers to a compound having two or more epoxy groups as reactive groups in one molecule. As the epoxy-based crosslinking agent, only one agent may be used alone, or two or more agents may be used in combination.

Examples of the epoxy-based crosslinking agent include epoxy resin composed of bisphenol A and epichlorohydrin, ethylene glycidyl ether, N,N,N',N'-tetraglycidyl-m-xylenediamine, diglycidyl aniline, diaminglycidylamine, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, and polypropylene glycol diglycidyl ether.

In the coating composition of the present invention, from the viewpoint of the curability of a coating film, the stability of the composition, and the like, the mixing ratio of the siloxane group-containing polymer (A) and the epoxy-based crosslinking agent is such that the ratio of the epoxy equivalent of the epoxy-based crosslinking agent/the hydroxyl group equivalent of the siloxane group-containing polymer (A) is preferably 0.5 to 2.5, more preferably 0.9 to 1.5. When the ratio of the epoxy equivalent of the epoxy-based crosslinking agent/the hydroxyl group equivalent of the siloxane group-containing polymer (A) is less than 0.5, the crosslinkability is insufficient, and when the ratio is more than 2.5, yellowing by heat tends to occur.

Aminoplast resins are condensation products of aldehydes such as formaldehyde, acetaldehyde, crotonaldehyde, and benzaldehyde with amino-containing or amide group-containing substances such as urea, melamine, and benzoguanamine, and examples thereof include benzoguanamine-formaldehyde resin, melamine-formaldehyde resin, esterified melamine-formaldehyde, and urea-formaldehyde resin.

<Hydroxyl Group-Containing Polymer (C)>

In the coating composition of the present invention, a hydroxyl group-containing polymer (C) may be blended, as necessary. Examples of the hydroxyl group-containing polymer (C) include acrylic resin, silicone acrylic resin, polyester resin, alkyd resin, silicone polyester resin, epoxy resin, epoxy ester resin, and fluororesin, and among these, acrylic resin, polyester resin, alkyd resin, epoxy resin, and epoxy ester resin can be suitably used. From the viewpoint of controlling functional groups and ease of production, an acrylic resin containing a hydroxyl group (hereinafter some-times referred to as "acrylic polyol resin") is preferable as the hydroxyl group-containing polymer (C).

The acrylic polyol resin can be prepared using one kind or two or more kinds of unsaturated monomers commonly used in the preparation of acrylic resin, such as a (meth)acrylic monomer, a hydroxyl group-containing acrylic monomer, and other copolymerizable monomers.

The (meth)acrylic monomer is not particularly limited, and examples thereof include alkyl esters such as methyl (meth)acrylate, ethyl (meth)acrylate, propyl (meth)acrylate, n, i or t-butyl (meth)acrylate, 2-ethylhexyl (meth)acrylate, and lauryl (meth)acrylate; amides such as (meth)acrylamide; and nitriles such as (meth)acrylonitrile.

As the hydroxyl group-containing acrylic monomer, one used as the hydroxyl group-containing vinyl monomer (b) used in the synthesis of the siloxane group-containing polymer (A) is suitably used. Furthermore, the additional copolymerizable monomer is a monomer copolymerizable with an acrylic monomer, and examples thereof include styrenes such as styrene and α-methylstyrene; and vinyl compounds such as vinyl acetate.

The method for producing the acrylic polyol resin is not particularly limited, and for example, the acrylic polyol resin can be produced by solution polymerization such as normal radical polymerization.

The acrylic polyol resin preferably has a weight average molecular weight (Mw) of 1,000 to 20,000. When the weight average molecular weight is in the above range, the balance of the viscosity of the coating composition and coating film properties such as the weather resistance of a resulting coating film can be maintained in a good range.

The quantitative ratio of the siloxane group-containing polymer (A) and the hydroxyl group-containing polymer (C) is preferably a weight ratio of 15:85 to 80:20 in the weight ratio of the siloxane group-containing polymer (A):the hydroxyl group-containing polymer (C). In the above range, a microphase-separated structure can be controlled through compatibilization of the hydroxyl group-containing polymer (C) with the siloxane group-containing polymer (A) for forming a microphase-separated structure, and a structural unit derived from the polysiloxane group-containing vinyl monomer (a) of a polymer block of chain A makes it possible to efficiently impart an antifouling function such as water/oil repellency to a coating film. The weight ratio of the siloxane group-containing polymer (A):the hydroxyl group-containing polymer (C) is preferably 20:80 to 75:25, and more preferably 30:70 to 60:40.

<Coating Composition>

The coating composition of the present invention can be prepared by mixing the respective components to constitute the coating composition with a means that is commonly used. The coating composition may contain a pigment, a surface conditioning agent (a defoaming agent, a leveling agent, etc.), a pigment dispersing agent, a plasticizer, a film-forming assistant, an ultraviolet absorber, an antioxidant, a flame retardant, an antistatic agent, an electrostatic auxiliary, a heat stabilizer, a light stabilizer, a solvent (water, organic solvent), and other additives, as necessary.

The coating composition of the present invention is applied to an article to be coated, and then cured at preferably 70 to 170° C., more preferably 70 to 160° C., and still more preferably 70 to 150° C.

<Article to be Coated>

Examples of an article to be coated to which the coating composition is to be applied include steel plates of metal such as iron, steel, stainless steel, aluminum, copper, zinc, and tin and alloys thereof; resins such as polyethylene resin, EVA resin, polyolefin resins (polyethylene resin, polypropylene resin, etc.), vinyl chloride resin, styrol resin, polyester resins (including PET resin, PBT resin, etc.), unsaturated polyester resin, polycarbonate resin, acrylic resin, acrylonitrile-butadiene-styrene (ABS) resin, acrylonitrile-styrene (AS) resin, polyamide resin, acetal resin, phenol resin, fluororesin, melamine resin, urethane resin, epoxy resin, and polyphenylene oxide (PPO); and organic-inorganic hybrid materials. These may have been molded. The coating composition of the present invention exhibits an effect particularly when the article to be coated is a material likely to be electrically charged, such as polyethylene resin, polyolefin resin (polyethylene resin, polypropylene resin, etc.), styrol resin, polyester resin (PET resin, PBT resin, etc.), and polycarbonate resin, or an unsaturated polyester resin used to be used for FRP or CFRP.

The method of application of the coating composition of the present invention is not particularly limited, and the coating composition can be applied by a commonly used application method. For example, when the coating composition of the present invention is applied to a car body, it can be applied by multi-stage application, preferably two stage application with use of air-electrostatic spray, or alternatively, there can be used an application method combining air electrostatic spray and a rotary atomization type electrostatic applicator, which is so-called "μμ (micro micro) bell", "μ (micro) bell", "metallic bell" or the like, in order to improve the appearance of a resulting coating film. In the case of coating a film or the like, such a method as roll coating, kiss roll coating, gravure coating, bar coating, knife coating, curtain coating, lip coating, or extrusion coating using a die coater or the like can be used. Furthermore, it is also possible to employ hand application, brush application, or the like using fibers impregnated with the coating composition of the present invention, and for example, it is possible to employ a method in which a dried sponge or a fiber such as waste is impregnated with an appropriate amount of the composition, the composition is thinly spread by hands on a surface of a base material, and then a coating film is formed by natural drying or forced drying using a dryer or the like.

The film thickness of the coating film formed from the coating composition of the present invention is, for example, preferably 0.5 μm to 50 μm, and more preferably 1 μm to 30 μm as a dry film thickness.

EXAMPLES

The present invention will be described hereafter in more detail by way of examples, to which the present invention is not intended to be limited. In the examples, "parts" and "%" are on a mass basis unless otherwise indicated.

[Production of Copolymer]

Production Example 1: Production of Siloxane Group-Containing Polymer (A-1)

A flask equipped with an argon gas introduction tube and a stirring blade was charged with 1.49 g of ethyl-2-methyl-2-n-butyltellanyl-propionate (BTEE), 0.92 g of dibutyl ditelluride (DBDT), 42 g of 2-hydroxyethyl methacrylate (HEMA), 98 g of isobutyl methacrylate (iBMA), 0.33 g of 2,2'-azobis(isobutyronitrile) (AIBN), and 140 g of butyl acetate (first monomer composition), and the mixture was reacted at 60° C. for 36 hours to polymerize a B block.

A mixed solution (second monomer composition) of 60.0 g of a siloxane group-containing acrylic monomer (X-22-

174ASX [functional group equivalent (g/mol)]: 900 [number average molecular weight: 900] manufactured by Shin-Etsu Chemical Co., Ltd.: abbreviated as "PDMSA" in Table 1) previously purged with argon, 0.33 g of AIBN, and 60 g of butyl acetate was added to the reaction solution, and the mixture was reacted at 60° C. for 36 hours to polymerize an A block. Physical properties of the resulting AB block siloxane group-containing polymer (A-1) are shown in Table 1. In Table 1, the blending amounts of monomers, the weight average molecular weight (Mw), the molecular weight distribution (Mw/Mn), the hydroxyl value, the production method (method using an organic tellurium compound (TERP)/free radical polymerization method (FRP)), the polymer mode (block polymer/random polymer), and the block mode (distinction between AB/ABA) of the siloxane group-containing polymer (A-1) are given.

Production Example 2: Production of Siloxane Group-Containing Polymer (A-2)

A flask equipped with an argon gas introduction tube and a stirring blade was charged with 1.49 g of BTEE, 0.92 g of DBDT, 42 g of HEMA, 78 g of iBMA, 0.33 g of AIBN, and 120 g of butyl acetate (first monomer composition), and the mixture was reacted at 60° C. for 36 hours to polymerize a B block.

A mixed solution (second monomer composition) of 60.0 g of X-22-174ASX previously purged with argon, 20 g of a phosphoric acid group-containing monomer (mono(propylene glycol monomethacrylate) phosphate manufactured by Johoku Chemical Co., Ltd., product name: JAMP-100N; abbreviated as "PO4(JAMP)" in Table 1), 0.33 g of AIBN, and 60 g of butyl acetate was added to the reaction solution, and the mixture was reacted at 60° C. for 36 hours to polymerize an A block. The physical properties, the weight average molecular weight (Mw), the molecular weight distribution (Mw/Mn), the hydroxyl value, the production method (TERP/FRP), the polymer mode (block polymer/random polymer), the block mode (distinction between AB/ABA) and the blending of monomers of the obtained AB block siloxane group-containing polymer (A-2) are given in Table 1.

Production Example 3: Production of Siloxane Group-Containing Polymer (A-3)

A siloxane group-containing polymer (A-3) was obtained in the same manner as in Production Example 1 except that 42 g of HEMA and 98 g of iBMA were changed to 140 g of iBMA. The physical properties, the weight average molecular weight (Mw), the molecular weight distribution (Mw/Mn), the hydroxyl value, the production method (TERP/FRP), the polymer mode (block polymer/random polymer), the block mode (distinction between AB/ABA) and the blending of monomers of the obtained siloxane group-containing polymer (A-3) are given in Table 1.

Production Example 4: Production of Siloxane Group-Containing Polymer (A-4)

A flask equipped with an argon gas introduction tube and a stirring blade was charged with 1.49 g of BTEE, 0.92 g of DBDT, 42 g of HEMA, 98 g of iBMA, 60 g of X-22-174ASX, 0.33 g of AIBN, and 400 g of butyl acetate (first monomer composition), and the mixture was reacted at 60° C. for 36 hours to afford a siloxane group-containing polymer (A-4) with a random structure. The physical properties, the weight average molecular weight (Mw), the molecular weight distribution (Mw/Mn), the hydroxyl value, the production method (TERP/FRP), the polymer mode (block polymer/random polymer), the block mode (distinction between AB/ABA) and the blending of monomers of the obtained siloxane group-containing polymer (A-4) with a random structure are given in Table 1.

Production Example 5: Production of Siloxane Group-Containing Polymer (A-5)

A 0.2 L separable flask equipped with a temperature controller, a stirring blade, a reflux tube, and a nitrogen introduction port was charged with 30 g of butyl acetate, and the inside of the flask was filled with a nitrogen atmosphere, and then the temperature was raised to 120° C. and kept constant. On the other hand, a mixed solution of 20.88 g of HEMA, 49.12 g of iBMA, 30 g of X-22-174ASX, and 0.88 g of Kayaester O was placed in a dropping funnel, and was added dropwise over 3 hours.

Subsequently, the reaction was continued for 1 hour, and then a mixed liquid of 2 g of butyl acetate and 0.5 g of Kayaester O was added dropwise as a post-initiator over 30 minutes, and the reaction was further continued for 1 hour to afford a siloxane group-containing polymer (A-5) with a random structure. The physical properties, the weight average molecular weight (Mw), the molecular weight distribution (Mw/Mn), the hydroxyl value, the production method (TERP/FRP), the polymer mode (block polymer/random polymer), the block mode (distinction between AB/ABA) and the blending of monomers of the obtained siloxane group-containing polymer (A-5) with a random structure are given in Table 1.

Production Example 6: Production of Siloxane Group-Containing Polymer (A-6)

A flask equipped with an argon gas introduction tube and a stirring blade was charged with 1.49 g of BTEE, 0.92 g of DBDT, 42 g of HEMA, 98 g of iBMA, 0.33 g of AIBN, and 140 g of butyl acetate (first monomer composition), and the mixture was reacted at 60° C. for 36 hours to polymerize a B block.

A mixed solution (second monomer composition) of 60.0 g of a siloxane group-containing acrylic monomer (X-22-174ASX manufactured by Shin-Etsu Chemical Co., Ltd.) previously purged with argon, 0.33 g of AIBN, and 60 g of butyl acetate was added to the reaction solution, and the mixture was reacted at 60° C. for 36 hours to polymerize an A block. Physical properties of the resulting AB block siloxane group-containing polymer (A-6) are shown in Table 1. In Table 1 are given the blending amounts of monomers, the weight average molecular weight (Mw), the molecular weight distribution (Mw/Mn), the hydroxyl value, the production method (TERP/FRP), the polymer mode (block polymer/random polymer), the block mode (distinction between AB/ABA) of the siloxane group-containing polymer (A-1).

Production Example 7: Production of Siloxane Group-Containing Polymer (A-7)

A flask equipped with an argon gas introduction tube and a stirring blade was charged with 1.49 g of BTEE, 0.92 g of DBDT, 42 g of HEMA, 98 g of iBMA, 0.33 g of AIBN, and 140 g of butyl acetate (first monomer composition), and the mixture was reacted at 60° C. for 36 hours to polymerize a B block.

A mixed solution (second monomer composition) of 60.0 g of a siloxane group-containing acrylic monomer (X-22-174BX [functional group equivalent (g/mol)]: 2300 [number average molecular weight: 2300] manufactured by Shin-Etsu Chemical Co., Ltd.: abbreviated as "PDMSA" in Table 1) previously purged with argon, 0.33 g of AIBN, and 60 g of butyl acetate was added to the reaction solution, and the mixture was reacted at 60° C. for 36 hours to polymerize an A block. Physical properties of the resulting AB block siloxane group-containing polymer (A-1) are shown in Table 1. In Table 1 are given the blending amounts of monomers, the weight average molecular weight (Mw), the molecular weight distribution (Mw/Mn), the hydroxyl value, the production method (TERP/FRP), the polymer mode (block polymer/random polymer), the block mode (distinction between AB/ABA) of the siloxane group-containing polymer (A-7).

Production Example 8: Production of Siloxane Group-Containing Polymer (A-8)

A flask equipped with an argon gas introduction tube and a stirring blade was charged with 1.49 g of BTEE, 0.92 g of DBDT, 42 g of HEMA, 98 g of isobornyl methacrylate (IBXMA), 0.33 g of AIBN, and 140 g of butyl acetate (first monomer composition), and the mixture was reacted at 60° C. for 36 hours to polymerize a B block.

A mixed solution (second monomer composition) of 60.0 g of a siloxane group-containing acrylic monomer (X-22-174ASX manufactured by Shin-Etsu Chemical Co., Ltd.) previously purged with argon, 0.33 g of AIBN, and 60 g of butyl acetate was added to the reaction solution, and the mixture was reacted at 60° C. for 36 hours to polymerize an A block. Physical properties of the resulting AB block siloxane group-containing polymer (A-8) are shown in Table 1. In Table 1 are given the blending amounts of monomers, the weight average molecular weight (Mw), the molecular weight distribution (Mw/Mn), the hydroxyl value, the production method (TERP/FRP), the polymer mode (block polymer/random polymer), the block mode (distinction between AB/ABA) of the siloxane group-containing polymer (A-8).

Production Example 9: Production of Siloxane Group-Containing Polymer (A-9)

A mixed solution (first monomer composition) of 60.0 g of a siloxane group-containing acrylic monomer (X-22-174ASX manufactured by Shin-Etsu Chemical Co., Ltd.) previously purged with argon, 0.33 g of AIBN, and 60 g of butyl acetate was added to a flask equipped with an argon gas introduction tube and a stirring blade, and the mixture was reacted at 60° C. for 36 hours to polymerize an A block.

A mixed solution (second monomer composition) of 42 g of HEMA previously purged with argon, 98 g of iBMA, 0.33 g of AIBN, and 140 g of butyl acetate was added to the reaction solution, and the mixture was reacted at 60° C. for 36 hours to polymerize a B block.

A mixed solution (first monomer composition) of 60.0 g of a siloxane group-containing acrylic monomer (X-22-174ASX manufactured by Shin-Etsu Chemical Co., Ltd.) previously purged with argon, 0.33 g of AIBN, and 60 g of butyl acetate was added to the reaction solution, and the mixture was reacted at 60° C. for 36 hours to polymerize an A block. Physical properties of the resulting ABA triblock siloxane group-containing polymer (A-9) are shown in Table 1. In Table 1 are given the blending amounts of monomers, the weight average molecular weight (Mw), the molecular weight distribution (Mw/Mn), the hydroxyl value, the production method (TERP/FRP), the polymer mode (block polymer/random polymer), the block mode (distinction between AB/ABA) of the siloxane group-containing polymer (A-9).

The number average molecular weight (Mn), the weight average molecular weight (Mw), and the molecular weight distribution (Mw/Mn) were measured by the following method.

[Measurement of Number Average Molecular Weight (Mn), Weight Average Molecular Weight (Mw), and Molecular Weight Distribution (Mw/Mn)]

A calibration curve was prepared by gel permeation chromatography (GPC) using TSKgel SuperMultipore HZ-H (Φ4.6×150)×2 (manufactured by Tosoh Corporation) as columns, tetrahydrofuran as a mobile phase, and polystyrene (TSK Standard manufactured by Tosoh Corporation) as a standard substance, and the weight average molecular weight (Mw) and the number average molecular weight (Mn) were measured. The molecular weight distribution (Mw/Mn) was calculated from these measured values.

Production of Hydroxyl Group-Containing Polymer (C)

A 2 L separable flask equipped with a temperature controller, a stirring blade, a reflux tube, and a nitrogen introduction port was charged with 444.27 g of butyl acetate, and the inside of the flask was filled with a nitrogen atmosphere, and then the temperature was raised to 130° C. and kept constant. On the other hand, a mixed liquid of 255 g of styrene (ST), 8.5 g of methacrylic acid (MAA), 394.4 g of HEMA, 117.47 g of 2-ethylhexyl acrylate (EHA), 74.72 g of iBMA, and 102 g of Kayaester O was placed in a dropping funnel, and was added dropwise over 3 hours.

Subsequently, the reaction was continued for 1 hour, and then a mixed liquid of 204 g of butyl acetate and 20.4 g of Kayaester O was added dropwise as a post-initiator over 30 minutes. The reaction was further continued for 1 hour, and dilution was conducted with butyl acetate such that the solid content was 60%, thereby affording a hydroxyl group-containing polymer (C). In Table 1 are given the weight average molecular weight (Mw), the molecular weight distribution (Mw/Mn), the hydroxyl value, and the production method (TERP/FRP) of the hydroxyl group-containing polymer (C).

N3600 (low viscosity hexamethylene diisocyanate trimer: NCO %=23) manufactured by Covestro AG was used as the crosslinking agent (B), and the NCO/OH ratio thereof was also given in Table 1.

Examples 1 to 12 and Comparative Examples 1 to 4

Preparation of Coating Composition and Coating Film

A coating composition was prepared by blending a siloxane group-containing polymer (A) (A-1 to A-9), N3600 (manufactured by Covestro AG, NCO %=23) as a crosslinking agent (B), and a hydroxyl group-containing polymer (C) in the blending amounts given in Table 1, and was diluted to 50% by weight of resin content by using butyl acetate. The coating composition was applied to a tin plate using an applicator such that the dry film thickness was 30 μm, and a test piece was left to stand for 7 minutes in a coating environment specified by a temperature of 20±5° C. and a relative humidity of 78% or less. Comparative Example 4 was an example in which no siloxane group-containing polymer was blended. In Table 1 is also given the weight ratio of the siloxane group-containing polymer (A) and the hydroxyl group-containing polymer (C) (the siloxane group-containing polymer (A):the hydroxyl group-containing polymer (C)).

Then, the test piece was dried and heat-cured at 140° C. for 30 minutes using a hot air dryer to afford a test piece having a substrate and a coating film. The formulation, various physical properties, and evaluation results of the obtained coating films are shown in Table 1.

The performance of the coating films obtained was evaluated by the methods described below, and the results are shown in Table 2. In addition, a transmission micrograph (TEM photograph) of some of the coating films obtained (Examples 1, 3, 4, 5 and 9) was taken and shown in FIG. 1. TEM photographs were also taken for Example 10 and Comparative Example 1 to 3, but no microseparated structure was confirmed, and therefore no photograph was provided. In Comparative Example 1 to 3, the coating film became cloudy.

[Transparency of Coating Film]

A surface of a coating film was visually observed and evaluated according to the following criteria.

○: The coating film was transparent, and no abnormality was observed at all.

Δ: The coating film was slightly milky white.

x: The coating film was cloudy.

[Removability of Oil-Based Organic Pollutant]

Rosin, terpineol, and limonene were put in carbon black (Furnace Black (KREMER pigmente), and stirred with a disper, affording a black tar liquid. This was taken as oil-based organic pollutant. Using an applicator, the black tar liquid was applied to the coating film obtained in an Example such that the dry film thickness was about 20 μm, and dried at 80° C. for 30 minutes using a hot air dryer, and the resultant was evaluated under the following conditions.

High pressure water jet conditions: jet nozzle (¼ PMEG-2506), water flow (11 L/min), water temperature (50° C.), washing time (1 minute), water jet distance (10 cm)

○ . . . The dirt is blown off simultaneously with water jetting. There is black dirt on the coated surface.

x . . . The dirt is not blown off cleanly. Black dirt remains on the coated surface.

This test is a test method for evaluating the degree of adherence of an oily organic pollutant and the easiness of removal thereof, and is a substitute test for the removability of oily pollutants from the viewpoint of the easiness of removal of dirt.

[Removability of Water Scale]

Evian (commercial name) was sprayed onto a coating film obtained in Example using an atomizer, and water droplets were placed on the coating film. This was dried in a hot air dryer at 60° C. for 10 minutes to allow water scale to adhere to the coating film. The coating film was washed with a sponge back and forth 10 times in running tap water, and then, the water scale remaining on the coating film was visually evaluated.

⊙ . . . No water scale is adhered.

○ . . . Almost all water scale is removed. Water scale in small dots remains.

x . . . Water scale is adhered in a ring like a coffee ring. (The appearance is poor.)

[Contact Angle and Evaluation of Water Repellency]

Using a DMo-701 model contact angle meter manufactured by Kyowa Interface Science Co., Ltd., about 1 μL of distilled water was deposited on a coating film surface under an atmosphere of 25° C. and 55% RH, and an angle formed by the droplet and the coating film surface after 10 seconds was calculated by a θ/2 method.

⊙ . . . The contact angle is 95 degrees or more.

○ . . . The contact angle is 85 degrees or more.

x . . . The contact angle is less than 85 degrees.

[Contact Angle and Evaluation of Water Repellency after Polishing]

Assuming car washing, a compound agent (#7500) was polished with an electric polisher for 10 seconds, the coating film was washed with ion-exchanged water using a neutral detergent, and then dried at room temperature to afford a coating film for measurement.

Using a DMo-701 model contact angle meter manufactured by Kyowa Interface Science Co., Ltd., about 1 μL of distilled water was deposited on a coating film surface under an atmosphere of 25° C. and 55% RH, and an angle formed by the droplet and the coating film surface after 10 seconds was calculated by a θ/2 method.

⊙ . . . The contact angle is 95 degrees or more.

○ . . . The contact angle is 85 degrees or more.

x . . . The contact angle is less than 85 degrees.

[Solvent Resistance Test]

2 μl of toluene was dropped onto a coating film obtained, and the coating film was allowed to stand for 5 minutes. After 5 minutes, the appearance after wiping with dry waste was evaluated according to the following criteria.

○ . . . No abnormality is observed in the coating film appearance.

Δ . . . A slight liquid droplet mark remains.

TABLE 1

| | | | Example 1 | Example 2 | Example 3 | Example 4 | Example 5 | Example 6 | Example 7 | Example 8 |
|---|---|---|---|---|---|---|---|---|---|---|
| | | | A-1 | A-2 | A-1 | A-1 | A-6 | A-7 | A-7 | A-8 |
| Siloxane group-containing polymer (A) | Siloxane-containing monomer (a) | PDMSA (Mn: 900) | 30 | 30 | 30 | 30 | 30 | | | 30 |
| | | PDMSA (Mn: 2300) | | | | | | 30 | 30 | |
| | Hydroxyl group-containing monomer (b) | HEMA | 21 | 21 | 21 | 21 | 21 | 21 | 21 | 21 |
| | Other copolymerizable monomer (c) | iBMA | 49 | 39 | 49 | 49 | 49 | 49 | 49 | |
| | | IBXMA | | | | | | | | 49 |
| | | PO4 (JAMP) | | 10 | | | | | | |
| | Weight average molecular weight (Mw) | | 50,000 | 51,000 | 50,000 | 50,000 | 80,000 | 51,000 | 51,000 | 45,000 |
| | Molecular weight distribution (Mw/Mn) | | 1.40 | 1.24 | 1.40 | 1.40 | 1.40 | 1.47 | 1.47 | 1.49 |

TABLE 1-continued

| | | | | | | | | | | |
|---|---|---|---|---|---|---|---|---|---|---|
| | Physical properties | Hydroxyl value | 90 | 90 | 90 | 90 | 90 | 90 | 90 | 90 |
| | Production method | TERP/FRP | TERP | TERP | TERP | TERP | TERP | TERP | TERP | TERP |
| | Polymer mode | Block/ random | Block | Block | Block | Block | Block | Block | Block | Block |
| | Block mode | AB/ABA | AB | AB | AB | AB | AB | AB | AB | AB |
| | Blending amount | (parts) | 13.6 | 13.6 | 35.6 | 55.6 | 35.6 | 13.6 | 35.6 | 13.6 |
| Crosslinking agent (B) | N3600 | NCO/OH | 1 | 1 | 1 | 1 | 1 | 1 | 1 | 1 |
| | Blending amount | (parts) | 32.1 | 32.1 | 28.8 | 25.8 | 28.8 | 32.1 | 28.8 | 32.1 |
| Hydroxyl group-containing polymer (C) | Weight average molecular weight (Mw) | | 8200 | 8200 | 8200 | 8200 | 8200 | 8200 | 8200 | 8200 |
| | Molecular weight distribution (Mw/Mn) | | 2.1 | 2.1 | 2.1 | 2.1 | 2.1 | 2.1 | 2.1 | 2.1 |
| | Physical properties | Hydroxyl value | 160 | 160 | 160 | 160 | 160 | 160 | 160 | 160 |
| | Production method | TERP/FRP | FRP | FRP | FRP | FRP | FRP | FRP | FRP | FRP |
| | Blending amount | (parts) | 54.3 | 54.3 | 35.6 | 18.6 | 35.6 | 54.3 | 35.6 | 54.3 |
| Weight ratio (A):(C) of siloxane group-containing polymer (A) to hydroxyl group-containing polymer (C) | | | 20:80 | 20:80 | 50:50 | 75:25 | 50:50 | 20:80 | 50:50 | 20:80 |

| | | | Example 9 | Example 10 | Example 11 | Example 12 | Comparative Example 1 | Comparative Example 2 | Comparative Example 3 | Comparative Example 4 |
|---|---|---|---|---|---|---|---|---|---|---|
| | | | A-8 | A-1 | A-1 | A-9 | A-3 | A-4 | A-5 | |
| Siloxane group-containing polymer (A) | Siloxane-containing monomer (a) | PDMSA (Mn: 900) | 30 | 30 | 30 | 30 | 30 | 30 | 30 | |
| | | PDMSA (Mn: 2300) | | | | | | | | |
| | Hydroxyl group-containing monomer (b) | HEMA | 21 | 21 | 21 | 21 | 0 | 21 | 21 | |
| | Other copolymerizable monomer (c) | iBMA | | 49 | 49 | 49 | 70 | 49 | 49 | |
| | | IBXMA | 49 | | | | | | | |
| | | PO4 (JAMP) | | | | | | | | |
| | Weight average molecular weight (Mw) | | 48,000 | 50,000 | 50,000 | 50,500 | 50,000 | 50,000 | 45,000 | |
| | Molecular weight distribution (Mw/Mn) | | 1.49 | 1.40 | 1.40 | 1.40 | 1.40 | 1.40 | 2.40 | |
| | Physical properties | Hydroxyl value | 90 | 90 | 90 | 90 | 0 | 90 | 90 | |
| | Production method | TERP/FRP | TERP | TERP | TERP | TERP | TERP | TERP | FRP | |
| | Polymer mode | Block/ random | Block | Block | Block | Block | Block | random | random | |
| | Block mode | AB/ABA | AB | AB | AB | ABA | AB | | | |
| | Blending amount | (parts) | 35.6 | 77.4 | 3.3 | 13.6 | 14.1 | 13.6 | 13.6 | |
| Crosslinking agent (B) | N3600 | NCO/OH | 1 | 1 | 1 | 1 | 1 | 1 | 1 | 1 |
| | Blending amount | (parts) | 28.8 | 22.6 | 33.7 | 32.1 | 29.3 | 32.1 | 32.1 | 34.2 |
| Hydroxyl group-containing polymer (C) | Weight average molecular weight (Mw) | | 8200 | | 8200 | 8200 | 8200 | 8200 | 8200 | 8200 |
| | Molecular weight distribution (Mw/Mn) | | 2.1 | | 2.1 | 2.1 | 2.1 | 2.1 | 2.1 | 2.1 |
| | Physical properties | Hydroxyl value | 160 | | 160 | 160 | 160 | 160 | 160 | 160 |
| | Production method | TERP/FRP | FRP | | FRP | FRP | FRP | FRP | FRP | FRP |
| | Blending amount | (parts) | 35.6 | | 63.0 | 54.3 | 56.6 | 54.3 | 54.3 | 65.8 |
| Weight ratio (A):(C) of siloxane group-containing polymer (A) to hydroxyl group-containing polymer (C) | | | 50:50 | 100:0 | 5:95 | 20:80 | 20:80 | 20:80 | 20:80 | 20:80 |

TABLE 2

| | Example 1 | Example 2 | Example 3 | Example 4 | Example 5 | Example 6 | Example 7 | Example 8 | Example 9 |
|---|---|---|---|---|---|---|---|---|---|
| Transparency of coating film | ○ | ○ | ○ | ○ | ○ | ○ | Δ | ○ | ○ |
| Oil-based organic contaminant removability | ○ | ○ | ○ | ○ | ○ | ○ | ○ | ○ | ○ |

TABLE 2-continued

| | | | | | | | | | |
|---|---|---|---|---|---|---|---|---|---|
| Fur removability | ○ | ○ | ○ | ○ | ○ | ○ | ○ | ⊙ | ⊙ |
| Contact angle | 99 | 97 | 99 | 99 | 100 | 102 | 102 | 99 | 98 |
| Evaluation of water repellency | ⊙ | ⊙ | ⊙ | ⊙ | ⊙ | ⊙ | ⊙ | ⊙ | ⊙ |
| Contact angle after polishing | 88 | 86 | 96 | 97 | 98 | 89 | 96 | 88 | 95 |
| Evaluation of water repellency after polishing | ○ | ○ | ⊙ | ⊙ | ⊙ | ○ | ⊙ | ○ | ⊙ |
| Solvent resistance test | ○ | ○ | ○ | ○ | ○ | ○ | ○ | ○ | ○ |

| | Example 10 | Example 11 | Example 12 | Comparative Example 1 | Comparative Example 2 | Comparative Example 3 | Comparative Example 4 |
|---|---|---|---|---|---|---|---|
| Transparency of coating film | ○ | ○ | ○ | X | X | X | ○ |
| Oil-based organic contaminant removability | ○ | ○ | ○ | ○ | ○ | ○ | X |
| Fur removability | ○ | ○ | ○ | ○ | ○ | ○ | X |
| Contact angle | 101 | 96 | 100 | 99 | 99 | 99 | 79 |
| Evaluation of water repellency | ⊙ | ⊙ | ⊙ | ⊙ | ⊙ | ⊙ | X |
| Contact angle after polishing | 98 | 84 | 87 | 86 | 86 | 86 | 79 |
| Evaluation of water repellency after polishing | ⊙ | Δ | ○ | ○ | ○ | ○ | X |
| Solvent resistance test | Δ | ○ | ○ | ○ | ○ | ○ | ○ |

As is apparent from Table 2, with the compositions of Examples, the transparency of a coating film is high, and the water repellency (water repellency and removability of oil-based organic pollutants) is also superior. Comparative Example 1 is an example in which no hydroxyl group-containing vinyl monomer is blended in a siloxane group-containing vinyl polymer, and compatibility is poor and the coating film is poor in transparency. Comparative Example 2 is an example of not block polymerization but random polymerization, and the transparency of the coating film is poor also in this example. Comparative Example 3 is an example in which the polymerization is random polymerization and the molecular weight distribution (Mw/Mn) is high, and the transparency of the coating film is poor also in this example. Comparative Example 4 is an example in which no siloxane group-containing polymer is blended as described above, and is poor in the evaluation of water repellency.

The invention claimed is:

1. A coating composition, comprising a siloxane group-containing polymer (A) a crosslinking agent (B), and a hydroxyl group-containing polymer (C),
 wherein
 the siloxane group-containing polymer (A) is a block copolymer comprising an A block and a B block, and containing, in the A block, at least a structural unit derived from a siloxane group-containing vinyl monomer (a) and containing, in the B block, a structural unit derived from a hydroxyl group-containing vinyl monomer (b) and, as necessary, a structural unit derived from another vinyl monomer (c) copolymerizable with the vinyl monomers (a) and (b),
 the siloxane group-containing polymer (A) is a copolymer having a molecular weight distribution (Mw/Mn) of 2.0 or less and polymerized by living radical polymerization, and
 the hydroxyl group-containing polymer (C) is a hydroxyl group containing acrylic resin.

2. The coating composition according to claim 1, wherein the siloxane group-containing polymer (A) is an AB-type diblock copolymer or an ABA-type triblock copolymer.

3. The coating composition according to claim 1, wherein the siloxane group-containing polymer (A) has a weight average molecular weight (Mw) of 5,000 to 100,000.

4. The coating composition according to claim 1, wherein the living radical polymerization is a method in which the polymerization is performed using an organic tellurium compound represented by formula (I):

[Chemical Formula 1]

(1)

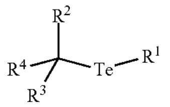

wherein $R^1$ represents a $C_1$ to $C_8$ alkyl group, aryl group, substituted aryl group, or aromatic heterocyclic group, $R^2$ and $R^3$ each represent a hydrogen atom or a $C_1$ to $C_8$ alkyl group, $R^4$ represents an aryl group, a substituted aryl group, an aromatic heterocyclic group, an acyl group, an oxycarbonyl group, or a cyano group.

5. The coating composition according to claim 1, wherein the blending ratio of the siloxane group-containing polymer (A) and the hydroxyl group-containing polymer (C) is 15:85 to 80:20 in terms of a weight ratio of the siloxane group-containing polymer (A): the hydroxyl group-containing polymer (C).

6. The coating composition according to claim 1, wherein the siloxane group-containing vinyl monomer (a) has a number average molecular weight (Mn) of 500 to 50,000.

7. The coating composition according to claim 1, wherein the crosslinking agent (B) is an isocyanate-based crosslinking agent.

8. The coating composition according to claim 2, wherein the siloxane group-containing polymer (A) has a weight average molecular weight (Mw) of 5,000 to 100,000.

9. The coating composition according to claim 2, wherein the living radical polymerization is a method in which the polymerization is performed using an organic tellurium compound represented by formula (I):

[Chemical Formula 1]

(1)

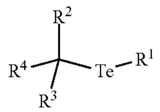

wherein $R^1$ represents a $C_1$ to $C_8$ alkyl group, aryl group, substituted aryl group, or aromatic heterocyclic group, $R^2$ and $R^3$ each represent a hydrogen atom or a $C_1$ to $C_8$ alkyl group, $R^4$ represents an aryl group, a substituted aryl group, an aromatic heterocyclic group, an acyl group, an oxycarbonyl group, or a cyano group.

10. The coating composition according to claim 2, wherein the blending ratio of the siloxane group-containing polymer (A) and the hydroxyl group-containing polymer (C) is 15:85 to 80:20 in terms of a weight ratio of the siloxane group-containing polymer (A): the hydroxyl group-containing polymer (C).

11. The coating composition according to claim 2, wherein the siloxane group-containing vinyl monomer (a) has a number average molecular weight (Mn) of 500 to 50,000.

12. The coating composition according to claim 2, wherein the crosslinking agent (B) is an isocyanate-based crosslinking agent.

* * * * *